(12) United States Patent
Panje (10) Patent No.: US 10,673,907 B2
(45) Date of Patent: Jun. 2, 2020

(54) SYSTEMS AND METHODS FOR PROVIDING DLNA STREAMING TO CLIENT DEVICES

(71) Applicant: ARRIS Enterprises, Inc., Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 274 days.

(21) Appl. No.: 14/801,132

(22) Filed: Jul. 16, 2015

(65) Prior Publication Data

US 2017/0019445 A1 Jan. 19, 2017

(51) Int. Cl.
*H04L 29/06* (2006.01)
*H04L 29/08* (2006.01)

(52) U.S. Cl.
CPC ...... *H04L 65/1069* (2013.01); *H04L 65/4084* (2013.01); *H04L 65/602* (2013.01); *H04L 65/80* (2013.01); *H04L 67/02* (2013.01)

(58) Field of Classification Search
CPC ... H04L 65/601; H04L 67/02; H04L 65/4084; H04L 65/605; H04L 65/1043; H04L 12/1886; H04L 2029/06054; H04L 65/1069; H04L 65/602; H04L 65/80; H04L 29/06; H04L 29/06027; H04L 69/329; H04L 67/1008; H04L 67/1097; H04L 67/1002; H04L 67/101; H04L 67/28; H04L 67/1029; H04L 67/2842; H04L 67/26; H04L 67/42; H04L 65/60; H04L 41/0816; H04L 65/40; H04L 65/4069; H04L 12/185; H04L 2209/603; H04N 21/2187; H04N 21/23805; H04N 21/258; H04N 21/23103; H04N 21/812; H04N 21/2405; H04N 21/84; H04N 21/6125; H04N 21/47202; H04N 21/8106; H04N 7/17336; H04N 21/4825; H04N 21/25808; H04N 21/25825; H04N 21/4621; H04H 20/82; H04H 60/06; H04H 20/16; G06F 17/30772; G06F 17/30053; G06F 17/30749
USPC ........................................................ 709/219
See application file for complete search history.

(56) References Cited

U.S. PATENT DOCUMENTS

| | | | |
|---|---|---|---|
| 2010/0036907 A1* | 2/2010 | Douillet | G06F 15/16 709/203 |
| 2010/0169303 A1 | 7/2010 | Biderman et al. | |
| 2010/0169453 A1 | 7/2010 | Biderman et al. | |
| 2010/0223407 A1* | 9/2010 | Dong | H04N 21/2343 710/70 |
| 2012/0079029 A1* | 3/2012 | Damola | H04L 12/66 709/204 |

(Continued)

FOREIGN PATENT DOCUMENTS

WO 01/84336 A1 11/2001

OTHER PUBLICATIONS

Xianshu Jin, Priyanka Deshpande, Ilchul Yoon, Seung Eui Yang and Sunyoung Han, "An Approach for QoE-based Media Sharing in DLNA Home Network", Nov. 2012, Cewit Korea, pp. 3-6.*

(Continued)

*Primary Examiner* — Tan Doan
(74) *Attorney, Agent, or Firm* — Thomas A. Ward (57) ABSTRACT

Provided herein are systems and methods that allow for converting Dynamic Adaptive Streaming over HTTP (DASH) or HTTP Live Streaming (HLS) to Digital Living Network Alliance (DLNA).

17 Claims, 10 Drawing Sheets

(56) References Cited

U.S. PATENT DOCUMENTS

| | | | | |
|---|---|---|---|---|
| 2013/0294527 A1* | 11/2013 | Cholas | ............... | H04N 21/4363 |
| | | | | 375/240.26 |
| 2014/0025710 A1* | 1/2014 | Sarto | ................... | G06F 17/3002 |
| | | | | 707/823 |
| 2014/0052770 A1* | 2/2014 | Gran | ................ | H04N 21/26258 |
| | | | | 709/203 |
| 2014/0195651 A1* | 7/2014 | Stockhammer | .. | H04N 21/23439 |
| | | | | 709/219 |
| 2014/0281009 A1* | 9/2014 | Moorthy | ........... | G06F 17/30017 |
| | | | | 709/231 |
| 2015/0074232 A1* | 3/2015 | Phillips | ................. | H04L 65/604 |
| | | | | 709/219 |
| 2015/0350283 A1* | 12/2015 | Yasuda | ................ | H04N 21/238 |
| | | | | 709/219 |
| 2015/0365450 A1* | 12/2015 | Gaunt | ................ | H04L 65/4084 |
| | | | | 709/231 |

OTHER PUBLICATIONS

Jin et al. (An Approach for QoE-based Media Sharing in DLNA Home Network. IEEE 2012).*

* cited by examiner

SYSTEMS AND METHODS FOR PROVIDING DLNA STREAMING TO CLIENT DEVICES

FIELD

The disclosure relates generally to the field of data transmission over digital networks, and more specifically to systems, devices and methods for providing IP DLNA streaming of content from a gateway or server to client devices.

BACKGROUND

Multimedia streaming over a network from a content server to a media device has been widely adopted for media consumption. One type of media streaming, adaptive bit rate (ABR) streaming is a technique used to stream media over computer networks. Current adaptive streaming technologies are almost exclusively based on HTTP and designed to work efficiently over large distributed HTTP networks such as the Internet.

For example, HTTP live streaming (HLS) protocol allows a content server to publish variant playlist files to media devices. A variant playlist file identifies multiple sets video streams or profiles for a media program, such as a movie, a television program, etc. where each set of video streams or profiles has unique encoding parameters (e.g., bit rates, resolutions, etc.) for the media program. As used herein, each stream at a particular resolution or bit rate is called a profile. Other HTTP standards include dynamic adaptive streaming over HTTP (DASH) and smooth streaming. DASH is a similar protocol that uses an mpd file to identify multiple sets video streams or profiles for a media program.

The media devices may dynamically switch between the profiles identified in the variant playlist file as the sets of video streams are transmitted from the content server to the media devices. The media devices may choose to receive an initial set of video streams identified in the variant playlist file based on initial network conditions, initial buffer conditions, etc. For example, the media devices may choose to receive high definition (HD) video streams identified in the variant playlist file if the initial network conditions, the initial buffer conditions, etc. support the streaming of the HD video streams. If the network conditions degrade or if the buffer conditions degrade, etc., then the media devices may choose to receive a lower definition or lower bitrate video streams identified in the variant playlist file. That is, the media device may choose different video streams to receive from the content server where the different sets of video streams have different encoding parameters.

Selection and transmission of the video streams are driven by the media devices. In response to a selection of a video streams identified in the variant playlist file, the content server passively transmits the video streams to the media device. While a media device may select the profiles it receives dynamically, the sets of video streams or profiles provided to the content server by a transcoder and then to the media devices are typically static or fixed. Consequently, the content server will typically receive and store numerous profiles for the media devices to select from. This generation and storage of numerous profiles is computationally and storage intensive.

Per recent FCC regulations, content servers, including HD set top boxes, are urged to offer media transport with discovery and remote control pass through using an open industry standard, such as digital living network alliance (DLNA), for home networking. Current HTTP based streaming, such as HLS, DASH and smooth streaming, do not meet device discovery, content UPNP publishing and open device addressing capabilities urged by recent FCC regulations. Thus, it would be desirable to source content streams to networked devices using open standards.

SUMMARY

Accordingly, there are provided herein systems and methods that allow for DLNA-based streaming from a content server or gateway in a home network to various client devices. Such systems and methods provide content in compliance with current open standards.

In a first aspect, a method of providing digital living network alliance (DLNA)-based streaming to a client device is disclosed. The method includes: receiving an HTTP live streaming (HLS) playlist or dynamic adaptive streaming over HTTP (DASH) manifest from a server; creating a new DLNA-based content directory service (CDS) having one or more CDS items for each HLS playlist and/or DASH manifest; and publishing the DLNA-based CDS for a client device.

In a second aspect, a converter system is disclosed. The system includes: a processor configured to load and execute instructions from a conversion module; and a conversion module configured to: receive an HTTP live streaming (HLS) playlist or dynamic adaptive streaming over HTTP (DASH) manifest from a server; create a new digital living network alliance (DLNA)-based content directory service (CDS) having one or more CDS items for each HLS playlist and/or DASH manifest; and publish the DLNA-based CDS for a non-HLS and/or non-DASH compliant client device.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

In the past few decades, advances in the related fields of video compression and video transmission systems have led to the widespread availability of digital video programs transmitted over a variety of communication systems and networks. Most recently, new technologies have been developed that have allowed television programs to be transmitted as multicast, e.g., IP multicast, digital bit streams of multiplexed video and audio signals delivered to users or client subscribers over packet switched networks.

Adaptive Bit Rate (ABR) streaming is a technology that works by breaking the overall media stream into a sequence of small HTTP-based file downloads, each download loading one short segment of an overall potentially unbounded transport stream. As the stream is played, the client (e.g., the media player) may select from a number of different alternate streams containing the same material encoded at a variety of data rates, allowing the streaming session to adapt to the available data rate. At the start of the streaming session, the player downloads/receives a manifest containing the metadata for the various sub-streams which are available. Since its requests use only standard HTTP transactions, Adaptive Bit Rate streaming is capable of traversing a firewall or proxy server that lets through standard HTTP traffic, unlike UDP-based protocols such as RTP. This also allows a content delivery network (CDN) to readily be implemented for any given stream. ABR streaming methods have been implemented in proprietary formats including HTTP Live Streaming (HLS) by Apple, Inc. and HTTP Smooth Streaming by Microsoft, Inc.

However, recent FCC regulation has prompted open media sharing. As provided above, HTTP based standards do not meet current FCC regulation. Further, there are several existing devices, which provide only DLNA capability and do not have ABR streaming incorporated. Thus, the ability to provide content streams to client devices using an open standard with the capabilities of ABR streaming is very desirable.

Figure 1:
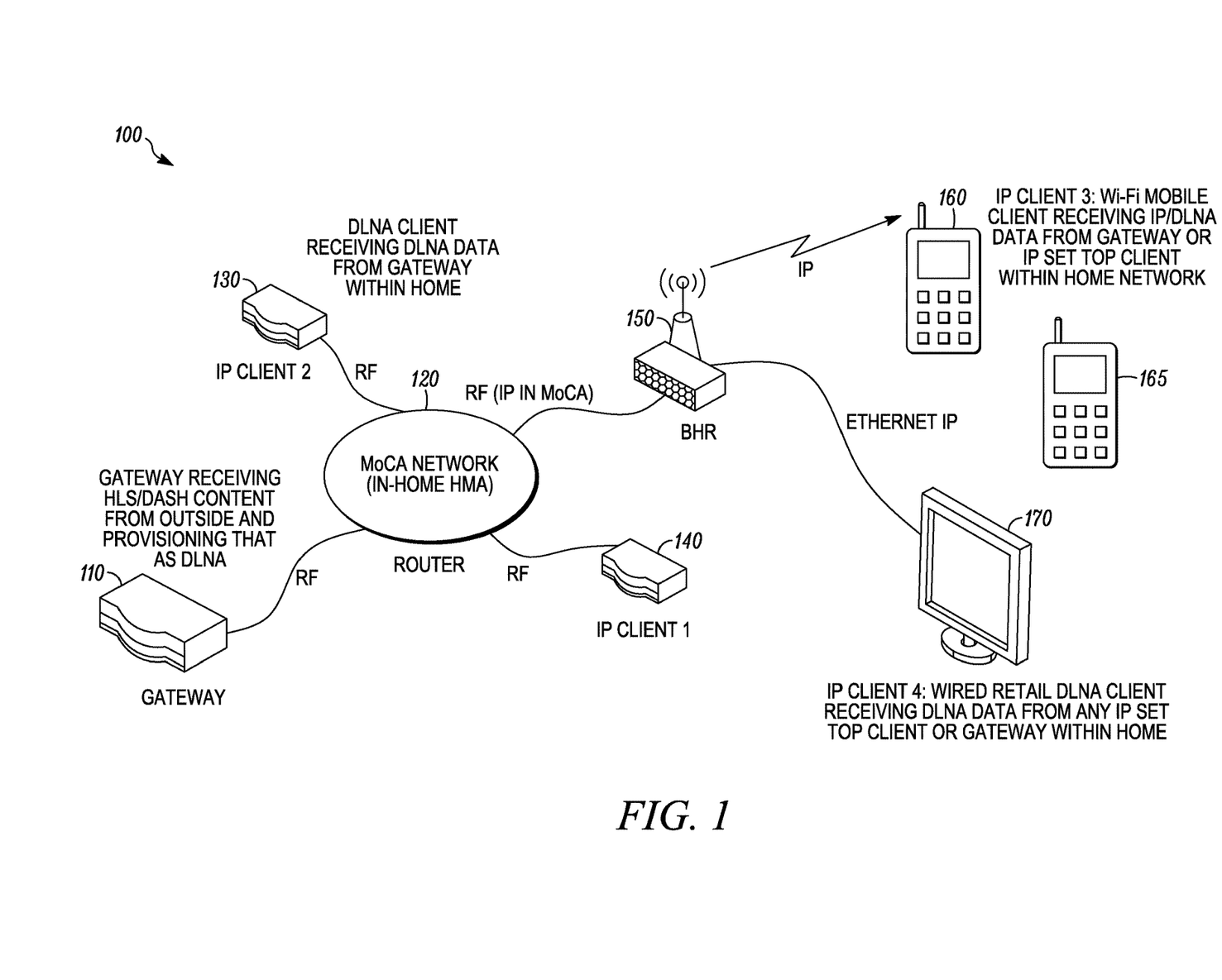
FIG. 1 is a functional block diagram illustrating communication in a system between a content server or gateway and a plurality of end users or clients in accordance with an embodiment.

FIG. 1 is a functional block diagram illustrating communication in a system 100 between a content server or gateway 110 and a plurality of end users or clients in accordance with an embodiment. System 100 includes gateway 110 configured to receive HLS/DASH content from a remote server and provision the HLS/DASH content a DLNA. System 100 also includes a router 120, such as a multimedia over coax (MoCA) network. System 100 also includes an IP client 2 130. As shown, IP client 2 130 is configured to receive DLNA data from gateway 110. System 100 includes an IP client 1 140.

System 100 includes a broadband home router (BHR) 150. BHR 150 is in communication with IP client 3 160, 165 and IP client 4 170. IP client 3 160 may be a Wi-Fi mobile client configured to receive IP/DLNA data from gateway 110 or IP set top client within home network 120. IP client 4 170 may be a wired retail DLNA client configured to receive DLNA data gateway 110 or IP set top client within home network 120.

Figure 2:
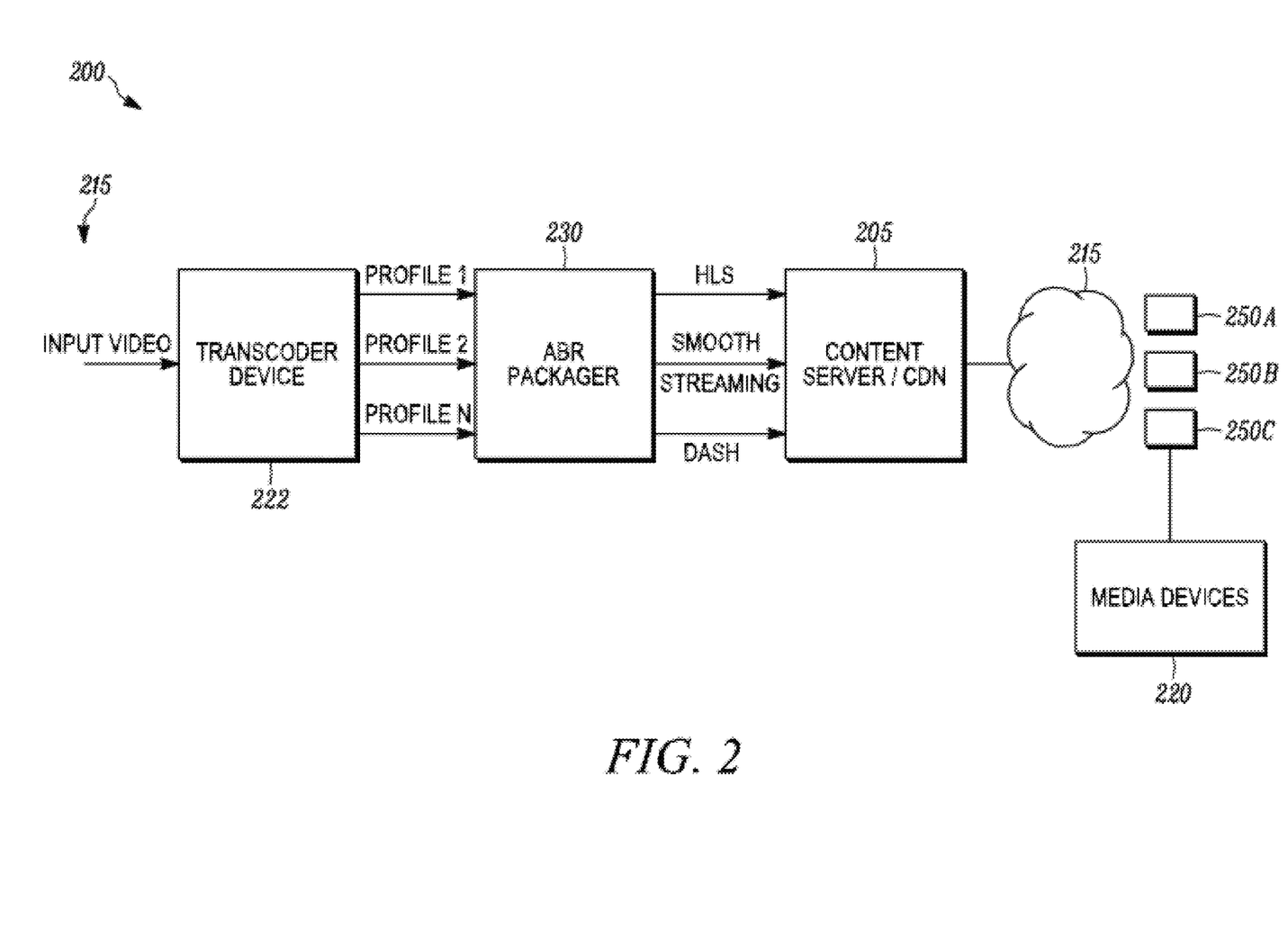
FIG. 2 is a functional block diagram illustrating an example environment in which the present techniques may be practiced in accordance with an embodiment.

FIG. 2 is a functional block diagram illustrating an example environment in which the present techniques may be practiced. Video streaming system 200 includes a transcoder device 222, adaptive bit rate (ABR) packager 230, content server or content delivery network (CDN) 205, network 215, edge cache servers 250a, 250b, 250c and a set of media devices 220. CDN 205 may transmit sets of video streams to media devices 220 via connection or network 215. A set of video streams may be for a media program, such as a movie, a television program etc. Each video stream in a set of video streams, also referred to as a profile, may be a short segment of video (e.g., two seconds, ten seconds, etc.). A set of video streams or profiles may include thousands of video streams for a media program, such as a two-hour movie. The sets of video streams may be provided to CDN 205 from transcoder device 222. Transcoder device 222 may include a number of transcoder resources where each transcoder resource may provide a set of video streams having unique encoding parameters (e.g., a bit rate, a resolution, etc.). Network 215 may include the Internet, various intranets, etc. Network 215 may include wired links and wireless links. It will be understood that the various references made herein to "media" and "video" include both video content and audio content.

As used herein, a video program or asset refers generally to a movie or television program. For ABR delivery, each video program asset is transcoded into multiple profiles. As used herein, a profile is an instance of the asset encoded at a particular resolution and bitrate. Each profile is divided into chunks or segments (e.g., two seconds, ten seconds, etc.) for delivery to the client devices.

Figure 3:
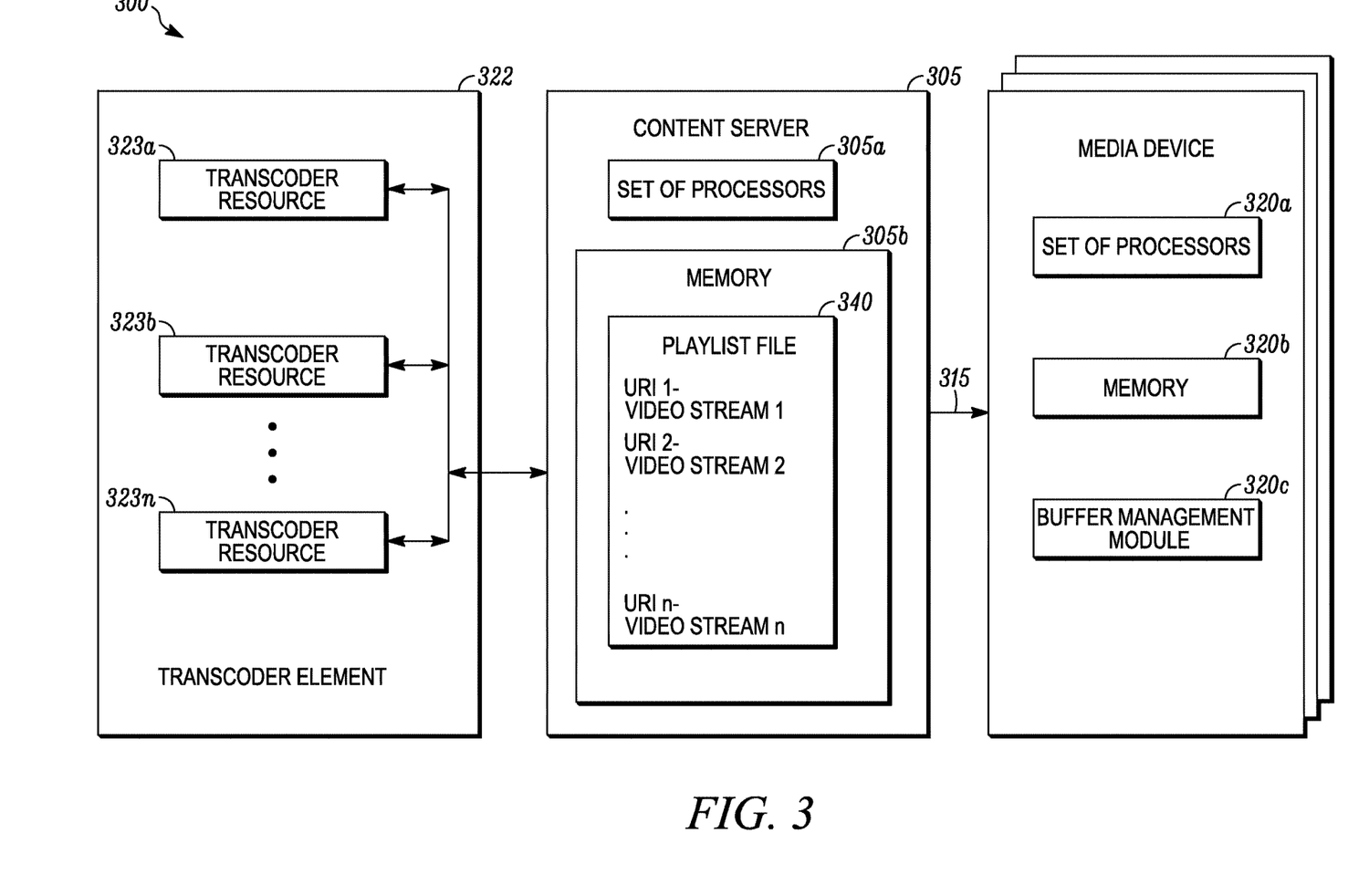
FIG. 3 is a functional block diagram illustrating an example video streaming system in accordance with an embodiment.

FIG. 3 is a functional block diagram illustrating an example video streaming system 300 in accordance with an embodiment. FIG. 3 provides more detail for a transcoder device, content server, and a media device, such as shown in FIG. 2. In some embodiments, transcoder device 322 is configured to receive video content in video content stream from a content/program provider (not shown) over any number of possible distribution networks with the goal of delivering this content to subscriber media devices 320 as an ABR streaming service. As used herein, transcoder device may refer to any device that encodes content into an acceptable format for ABR streaming. Transcoder device 322 may include a number of transcoder resources 323a, 323b, 323n where each transcoder resource may provide a set of video streams having unique encoding parameters (e.g., a bit rate, a resolution, etc.).

Content server 305 may include a set of processors 305a and a non-transitory computer readable storage medium (memory) 305b. Memory 305b may store instructions, which the set of processors 305a may execute to carry out various embodiments described herein. Content server 305 may include a number of computer devices that share a domain. Content server 305 may generate a number of playlist files 340 for the sets video streams that may be provided by transcoder resources 323. Each playlist file 340 may include uniform resource identifiers (URIs) for the video streams generated by transcoder resource 323. Each playlist file 340 is for a set of video streams having unique encoding parameters (e.g., bit rate, resolution, etc.) according to one embodiment. The encoding parameters for resolution may include QVGA, HVGA, VGA, 480p30, and 720p30 resolutions. The encoding parameters for bitrate may be from 200 Kbps to 5 Mbps, for example. For example, a first playlist file 340 may be for a first set of video streams for a media program having encoding parameters of 480p30 resolution and a 3 Mbps bit rate, a second playlist file 340 may be for a second set of video streams for the media program having 720p30 resolution and a 3 Mbps bit rate, a third playlist file 340 may be for a third set of video streams for the media program having 720p30 resolution and a 5 Mbps bit rate, etc.

Each media device 320 may include a set of processors 320a and a non-transitory computer readable storage medium (memory) 320b. Memory 320b may store instructions, which the set of processors 320a may execute to carry out various embodiments described herein. Media device 320 may also include a buffer management module 320c and a receive buffer (not shown). Receive buffer receives video packets for a set of video streams 315 that is transmitted from content server 305 to media device 320 for a media program. The video packets may be retrieved by the set of processors 320a from receiver buffer as media device 320 consumes the video packets. As used herein, encoded content such as video packets may be divided into fixed duration segments (e.g., chunks) The segments or chunks are typically between two and 10 seconds in duration, although they may be longer or shorter. Each second can have 30 or 60 frames. In some embodiments, shorter segments reduce coding efficiency while larger segments impact speed to adapt to changes in network throughput.

Figure 4:
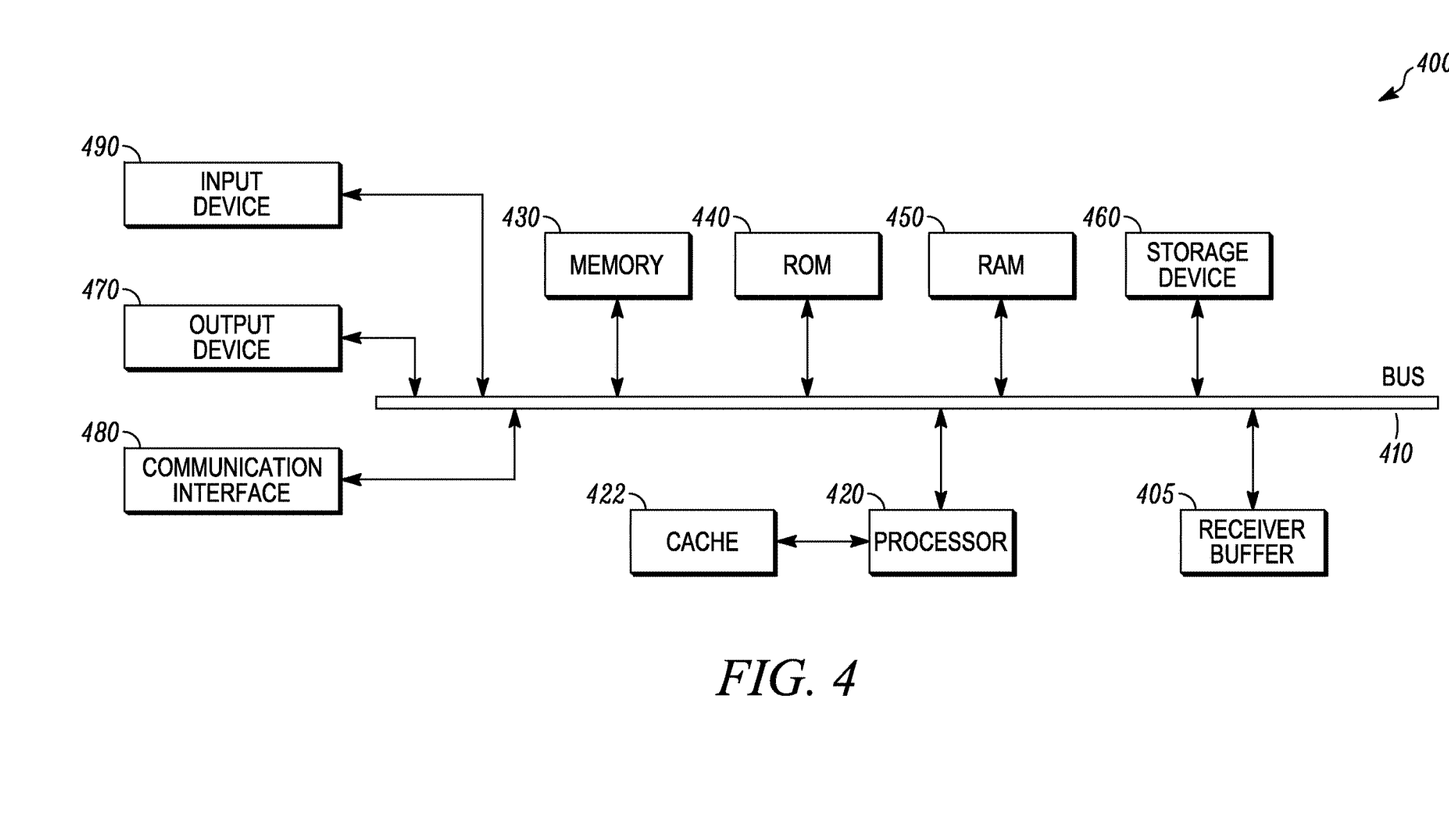
FIG. 4 is a functional block diagram illustrating example hardware elements in which the present techniques may be practiced in accordance with an embodiment.

FIG. 4 is a functional block diagram illustrating example hardware elements of a media device in which the present techniques may be practiced in accordance with an embodiment. An example media device or server may include a general-purpose computing device 400, including a processing unit (CPU or processor) 420 and a system bus 410 that couples various system components including the system memory 430 such as read-only memory (ROM) 440 and random-access memory (RAM) 450 to the processor 420. The system 400 can include a cache 422 of high-speed memory connected directly with, in close proximity to, or integrated as part of the processor 420. The system 400 may be configured to copy data from the memory 430 and/or the storage device 460 to the cache 422 for quick access by the processor 420. In this way, the cache 422 provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general-purpose processor and a hardware module or software module stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460, such as a hard disk drive, a magnetic disk drive, an optical disk drive, tape drive or the like. The storage device 460 can include software modules for controlling the processor 420. Other hardware or software modules are contemplated. The storage device 460 is connected to the system bus 410 by a drive interface. The drives and the associated computer readable storage media provide nonvolatile storage of computer readable instructions, data structures, program modules and other data for the computing device 400. In some embodiments, a hardware module that performs a particular function includes the software component stored in a non-transitory computer-readable medium in connection with the necessary hardware components, such as the processor 420, bus 410, display 470, and so forth, to carry out the function. The basic components are known to those of skill in the art and appropriate variations are contemplated depending on the type of device, such as whether the device 400 is a small, handheld computing device, a desktop computer, a computer server, or the like.

Although some implementations employ the hard disk 460, it should be appreciated by those skilled in the art that other types of computer readable media which can store data that are accessible by a computer, such as magnetic cassettes, flash memory cards, digital versatile disks, cartridges, random access memories (RAMs) 450, read only memory (ROM) 440, a cable or wireless signal containing a bit stream and the like, may also be used in the exemplary operating environment. Non-transitory computer-readable storage media expressly exclude media such as energy, carrier signals, electromagnetic waves, and signals per se.

Computing device 400 also includes a receive buffer 405 for receiving and storing video packets. A buffer management module (not shown) may monitor the rate at which video packets in buffer 405 are retrieved for consumption by computing device 100.

To enable user interaction with the computing device 400, an input device 490 represents any number of input mechanisms, such as a microphone for speech, a touch sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement, and therefore, the basic features here may easily be substituted for improved hardware or firmware arrangements as they are developed.

Figure 5:
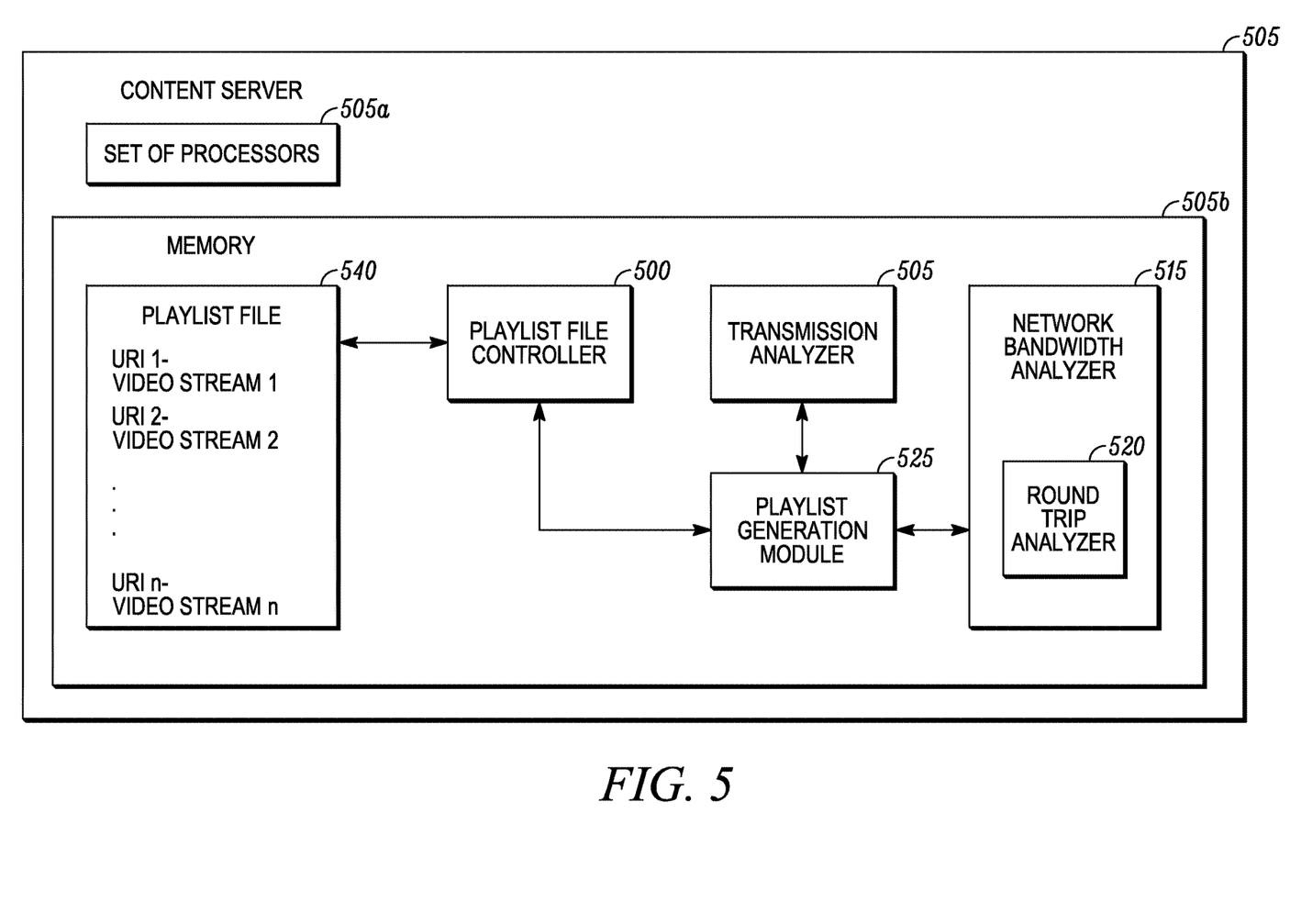
FIG. 5 is a functional block diagram illustrating example software elements in which the present techniques may be practiced in accordance with an embodiment.

FIG. 5 is a functional block diagram illustrating example software elements of a content server in which the present techniques may be practiced in accordance with an embodiment. Content server 505 may include a playlist file controller 500 for storing playlist files 540 in memory 505b and for reading playlist 540 files from memory 505b. Content server 505 may include a set of processors 505a for extracting information for current window size from transmissions received by content server 505 from a media device. Content server 505 may also include a network bandwidth analyzer 515 that estimates the current bandwidth capacity between content server 505 and a media device. Network bandwidth analyzer 515 may include a round trip analyzer 520 that determines round trip times of sets of transmissions transmitted between content server 505 and a media device. Network bandwidth analyzer 515 may determine current bandwidth capacity of network links of a network linking content server 505 and a media device based on the round trip times generated by round trip analyzer 520.

Set of processors 505a may provide the current window size to a playlist generation module 525, and network bandwidth analyzer 515 may provide the current bandwidth capacity to playlist generation module 525. Playlist generation module 525 may use the current bandwidth capacity to determine a set of video streams to transmit to a media device where the set of video streams has a set of encoding parameters for the current bandwidth capacity. Playlist generation module 525 may also generate playlist file 540 for the set of video streams, which is stored in memory by playlist file controller 500. Content server 505 configures the transcoder resources accordingly to generate the desired media chunks.

As provided above, HLS and DASH are provisioned to edge cache servers or gateway devices through a multiple system operator (MSO) network and there exists a need to provision the HTTP based content such as HLS/DASH content to plain DLNA devices in a home environment. Thus, it would be advantageous if HLS/DASH streams were converted to DLNA (e.g., with DLNA signaling).

Figure 6:
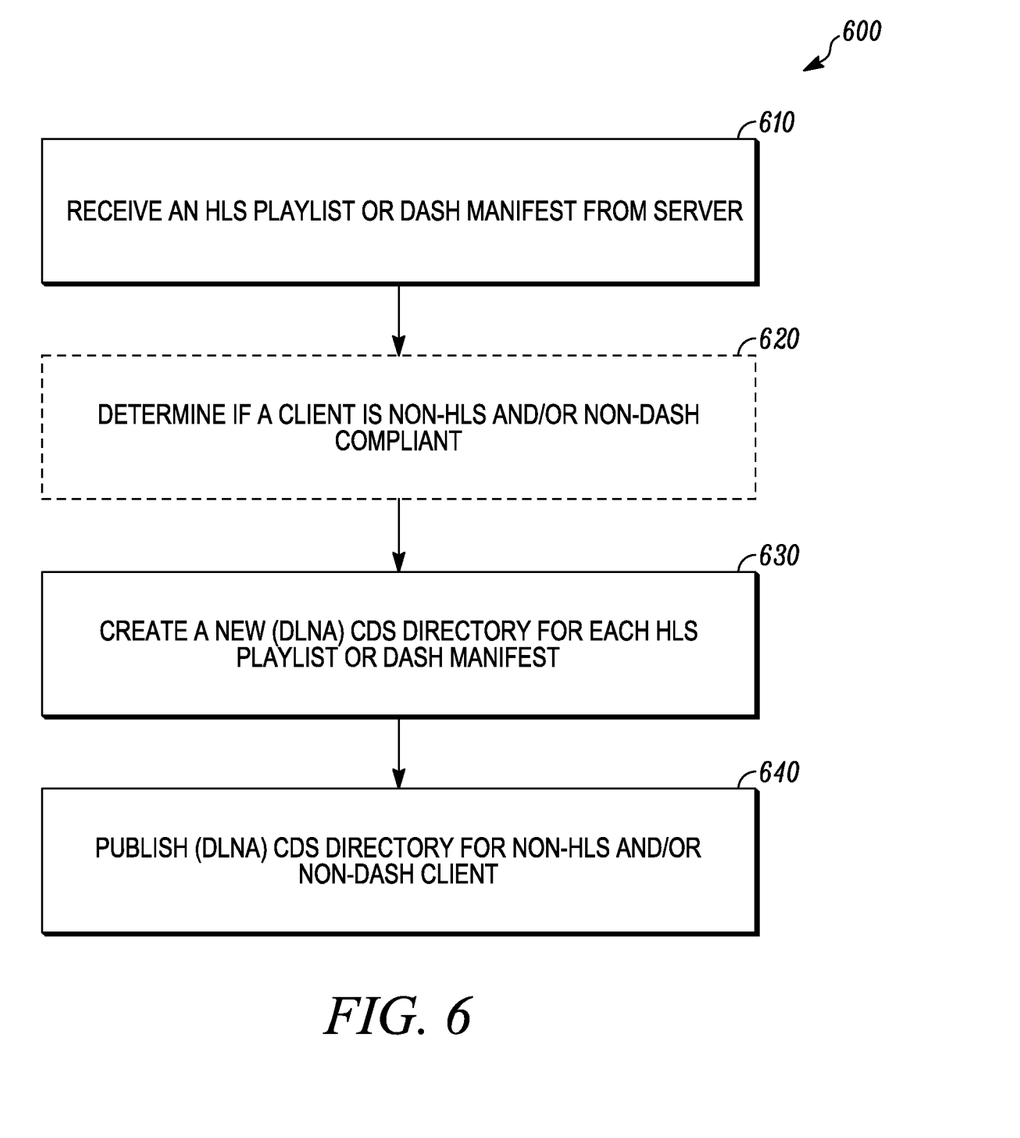
FIG. 6 is an example process for providing DLNA-based streaming to a client device in accordance with an embodiment.

FIG. 6 is an example process 600 for providing DLNA-based streaming to a client device in accordance with an embodiment. In operation 610, an HLS playlist or DASH manifest is received from a server. In some embodiments, a gateway, edge cache server, content server, or any suitable server receives the HLS playlist or DASH manifest from an external server. In such embodiments, the gateway or edge cache server or content server can perform the operations described in FIG. 6. In optional operation 620, it is determined if a client device is non-HLS or non-DASH compliant. In some embodiments, a client device is deemed as non-HLS and/or non-DASH compliant upon receiving a DLNA CDS listing query on a server by the client. Such non-HLS or non-DASH compliant devices may include, for example, standard retail clients such as video game consoles and mobile phones. In operation 630, a new DLNA-based content directory service (CDS) having one or more CDS items for each HLS playlist and/or DASH manifest is created. In some embodiments, operation 630 is performed if a client device is non-HLS or non-DASH compliant. In some embodiments, operation 630 is performed for all client devices, whether HLS or DASH compliant or not. In operation 640, the DLNA-based CDS is published for the client devices.

Figure 7:
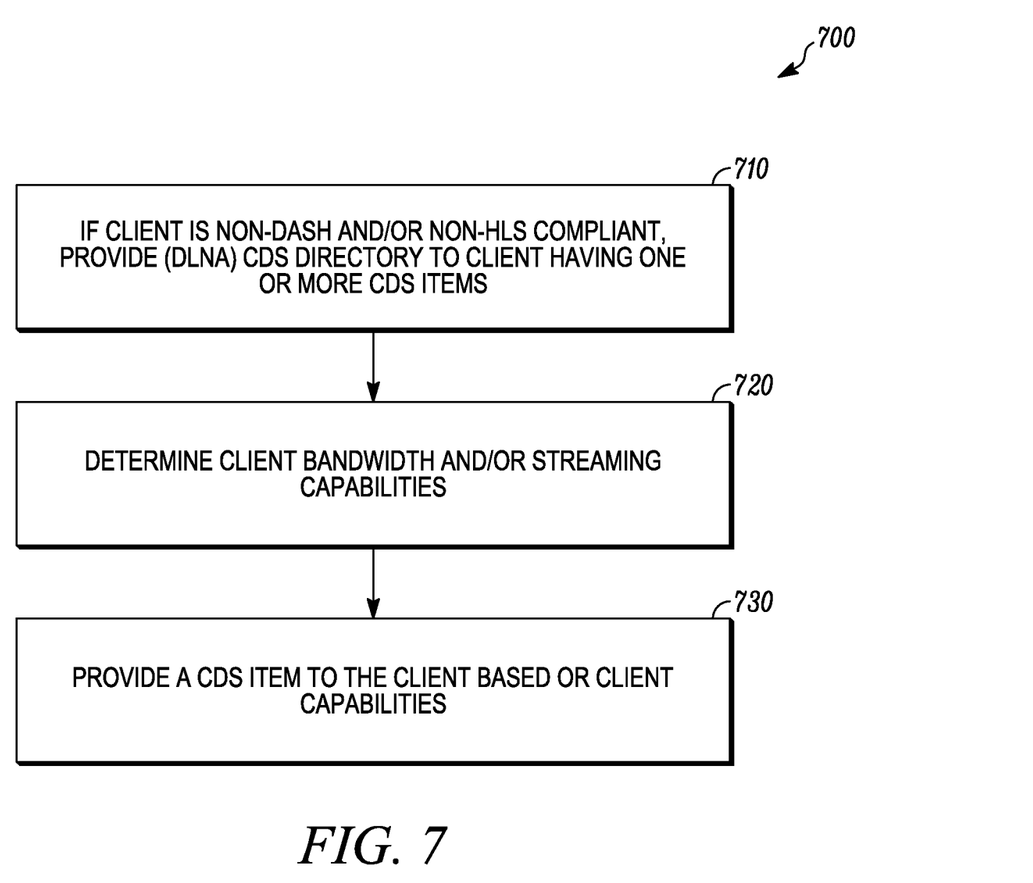
FIG. 7 is an example process for providing DLNA-based streaming to a client device based on client capabilities in accordance with an embodiment.

FIG. 7 is an example process 700 for providing DLNA-based streaming to a client device based on client capabilities in accordance with an embodiment. In operation 710, if a client device is non-DASH or non-HLS compliant, a DLNA CDS directory having one or more CDS items is provided to a client device. In some embodiments, operation 710 is performed for all client devices, not just non-DASH or non-HLS compliant client devices. In operation 720, the client device bandwidth and/or streaming capabilities are determined. Such bandwidth and/or streaming capabilities may be determined as will be described in more detail with respect to FIG. 9. In operation 730, a CDS item is then provided to the client device based on the client device capabilities.

Figure 8:
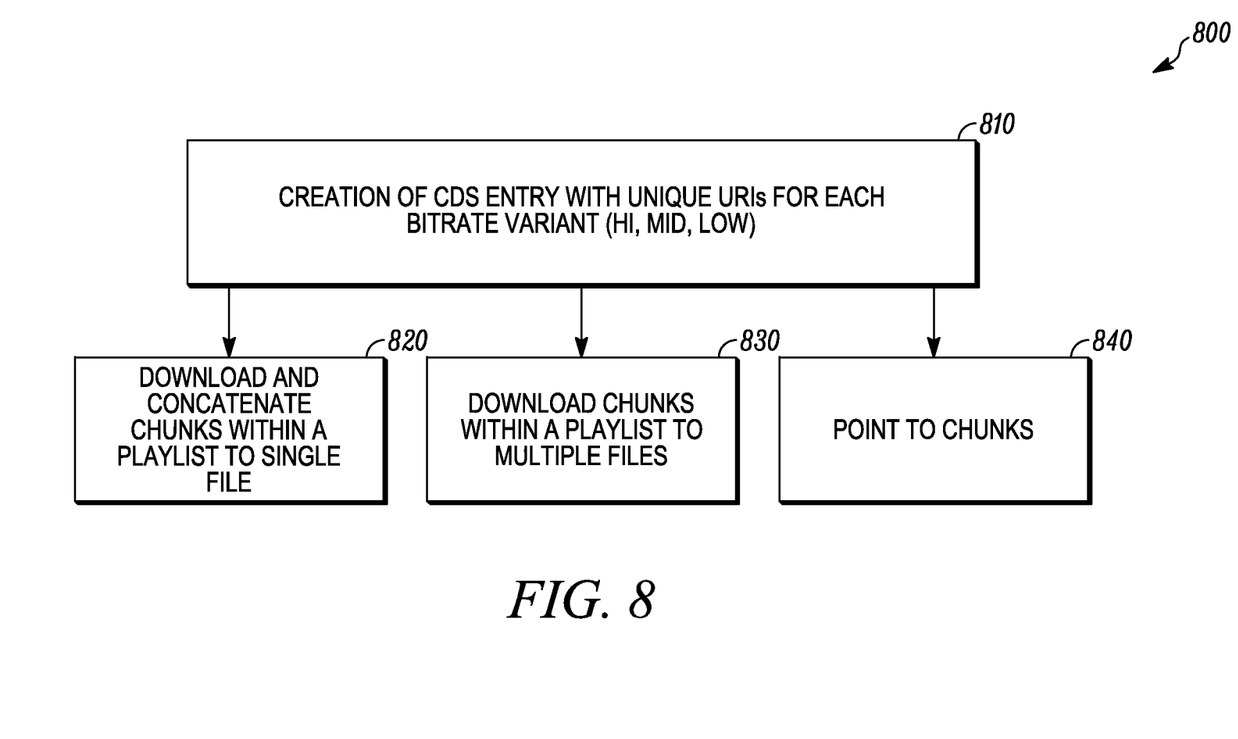
FIG. 8 is an example process for creating a CDS item or entry for a client device in accordance with an embodiment.

FIG. 8 is an example process 800 for creating a CDS item or entry for a client device in accordance with an embodiment. In operation 810, the creation of CDS entry with unique URIs for each HLS bit rate variant received is initiated. For example, for a single HLS video or transport stream, three variant playlists (e.g., corresponding to different bit rates) may be received—a high bit rate (hi), a medium bit rate (mid), and a low bit rate (low). A corresponding CDS directory hierarchy would include:

Directory/Hi_bitrate/Local_Hi.ts
Directory/Mid_bitrate/Local_Mid.ts
Directory/Low_bitrate/Local_Low.ts In operation 820, a gateway or edge cache server or content server receives the chunks or content segments for an HLS playlist (.m3u8 files(s)). In some embodiments, the gateway receives the HLS playlist content by downloading the content segments from a remote server. Thereafter, a single transport stream (TS) file is created from the plurality of downloaded content segments. In some embodiments, creating a single TS file involves concatenating the plurality of content segments from the HLS playlist into a single TS file URL. In this way, the gateway can offer the single TS file inside a CDS container as a single file content URL. The gateway can progressively download the content segments and append them to the single TS file. For example, all high bit rate playlist content segments are placed under a single high bit rate directory—Directory/Hi_bitrate/Local_Hi.ts Alternatively, in operation 820, a gateway or edge cache server or content server receives the chunks or content segments for a DASH manifest (.mpd file(s)). In some embodiments, the gateway receives the DASH manifest content by downloading the content segments from a remote server. Thereafter, a single TS file is created from the plurality of downloaded content segments. In some embodiments, creating a single TS file involves concatenating a plurality of TS files from a DASH manifest .mpd file into a single TS file URL.

In current technology, any number of variant playlists (.m3u8) or .mpd files can be received by the gateway or content server. Thus, one could imagine a large number of playlists or .mpd files having to be downloaded and provided as CDS items to the client device. Therefore, in some embodiments, it may be desirable to limit the number of CDS items created based upon a predetermined number of bit rate variants, such as 20, 15, 10, 5, or 3, depending on the client device home environment.

Furthermore, because DLNA is plain content without ABR, there is no bit rate variation in the DLNA. Thus, in some embodiments, there is no need to have multiple CDS items, as a single variant could be provided. In other words, with DLNA, a client can select content to play without browsing through multiple variants of that content.

In operation 830, a gateway receives HLS playlist content by downloading the content segments from a remote server. Thereafter, a plurality of TS files is created from the plurality of downloaded content segments. In some embodiments, each TS file corresponds to a downloaded content segment. Thus, in each directory, there are multiple files, each corresponding to a content segment.

Alternatively, in operation 830, a gateway receives DASH manifest content by downloading the content segments from a remote server. Thereafter, a plurality of TS files is created from the plurality of downloaded content segments. In some embodiments, each TS file corresponds to a downloaded content segment. Thus, in each directory, there are multiple files, each corresponding to a content segment.

In operation 840, a gateway provides a pointing means to point to a plurality of content segments for the HLS playlist. For example, the gateway could point to content segments stored on a remote server. In such embodiments, there is no downloading of content to the gateway.

Alternatively, in operation 840, a gateway provides a pointing means to point to a plurality of .mpd files for the DASH manifest. For example, the gateway could point to content segments stored on a remote server. In such embodiments, there is no downloading of content to the gateway.

Figure 9:
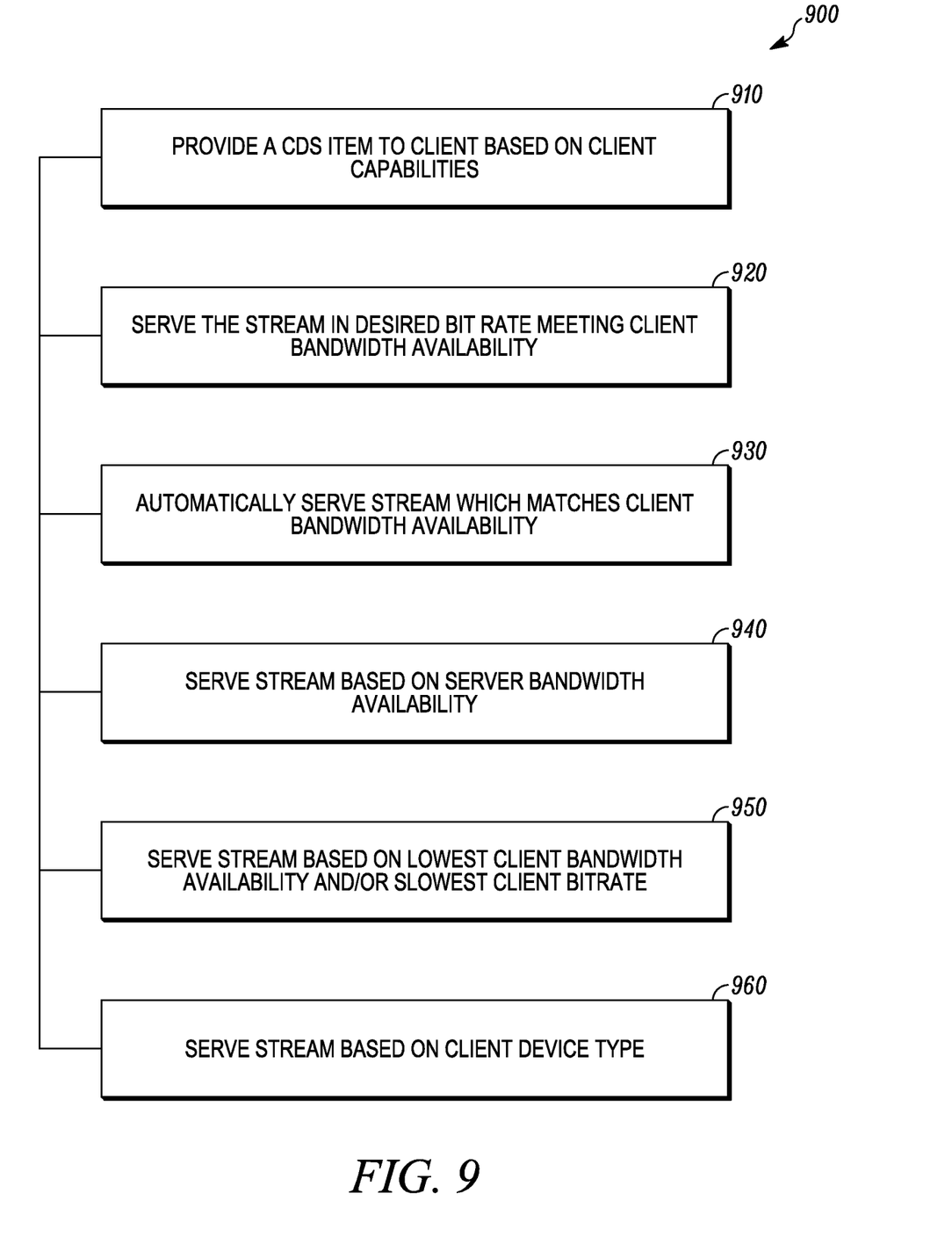
FIG. 9 is an example process for providing a CDS item to a client device in accordance with an embodiment.

FIG. 9 is an example process 900 for providing a CDS item to a client device in accordance with an embodiment. In operation 910, a CDS item or entry based on client capabilities is provided to the client device from the gateway or content server. As provided above, the content server is configured to determine the streaming capability of the client device(s) or of the overall system. The streaming capability may include bandwidth (used and/or available), bit rate, computing power left, combinations thereof, etc. Such determination of streaming capability of the client device is discussed with respect to FIG. 3 and FIG. 5.

For example, referring back to FIG. 3, while content server 305 provides a set of video streams for a media program to media device 320, content server 305 may change the particular set of video streams that content server 305 transmits to media device 320 where the two sets of video streams may have different encoding parameters (e.g., resolutions, bit rates, etc.). For example, as content server 305 provides a set of video streams for a media program to media device 320, content server 305 may change the particular set of video streams transmitted to media device 320 to change the resolution and the bit rates of the set of video streams to adjust to changes identified by a buffer management module 320c in media device 320.

According to some embodiments, if the current bandwidth capacity between content server 305 and media device 320 is reduced, content server 305 may switch from transmitting high bit rate (e.g., 3 Mbps rate) video streams to transmitting lower bit rate (e.g., 500 Kbps) video streams to accommodate the reduced current bandwidth capacity. Content server 305 may also switch from transmitting a high resolution (e.g., 720p30) set of video streams to transmitting a lower resolution (e.g., VGA) set of video streams. Conversely, if the current bandwidth capacity between content server 305 and media device 320 increases, content server 305 may switch from transmitting a low bit rate (e.g., 500 Kbps rate) set of video streams to transmitting a higher bit rate (e.g., 2 Mbps) set of video streams to accommodate the increased current bandwidth capacity. Content server 305 may also switch from transmitting a low resolution (e.g., VGA) set of video streams to transmitting a higher resolution (e.g., 720p30) set of video streams.

In operation 920, the gateway or content server serves the DLNA-based stream to the client device at a desired bit rate as requested by the client. For example, the gateway may serve the contents within the Directory/Hi_bitrate/Local_Hi.ts or Directory/Hi_bitrate/Mid_Hi.ts in the beginning as requested by the client.

In operation 930, the gateway or content server automatically serves the DLNA stream to the client device that matches the client bandwidth availability. This differs from operation 920, as described below. In such embodiments, the gateway or content server can reroute the DLNA URI request to an appropriate CDS entry. For example, the gateway may serve the contents within the Directory/Hi_bitrate/Local_Hi.ts in the beginning and may automatically redirect the HTTP GETS to say Directory/Hi_bitrate/Mid_Hi.ts as the in-home bandwidth decreases.

In operation 940, the gateway or content server serves the DLNA stream based on server bandwidth availability. In such an embodiment, the gateway or content server streams the DLNA data according to its current operating conditions or capabilities.

In operation 950, the gateway or content server serves the DLNA stream based on the lowest client bandwidth availability and/or slowest client bit rate. In such an embodiment, this ensures that all client devices can play the DLNA stream.

In operation 960, the gateway or content server serves the DLNA stream based on client device type. For example, client devices such as mobile phones will receive the DLNA stream at a first bandwidth and/or bit rate, while client devices such as video game consoles will receive the DLNA stream at a second bandwidth and/or bit rate, and client devices such as tablets will receive the DLNA stream at a third bandwidth and/or bit rate. In some embodiments, one or more of the first, second and third bandwidth and/or bit rates are the same. In other embodiments, one or more of the first, second and third bandwidth and/or bit rates are different.

Figure 10:
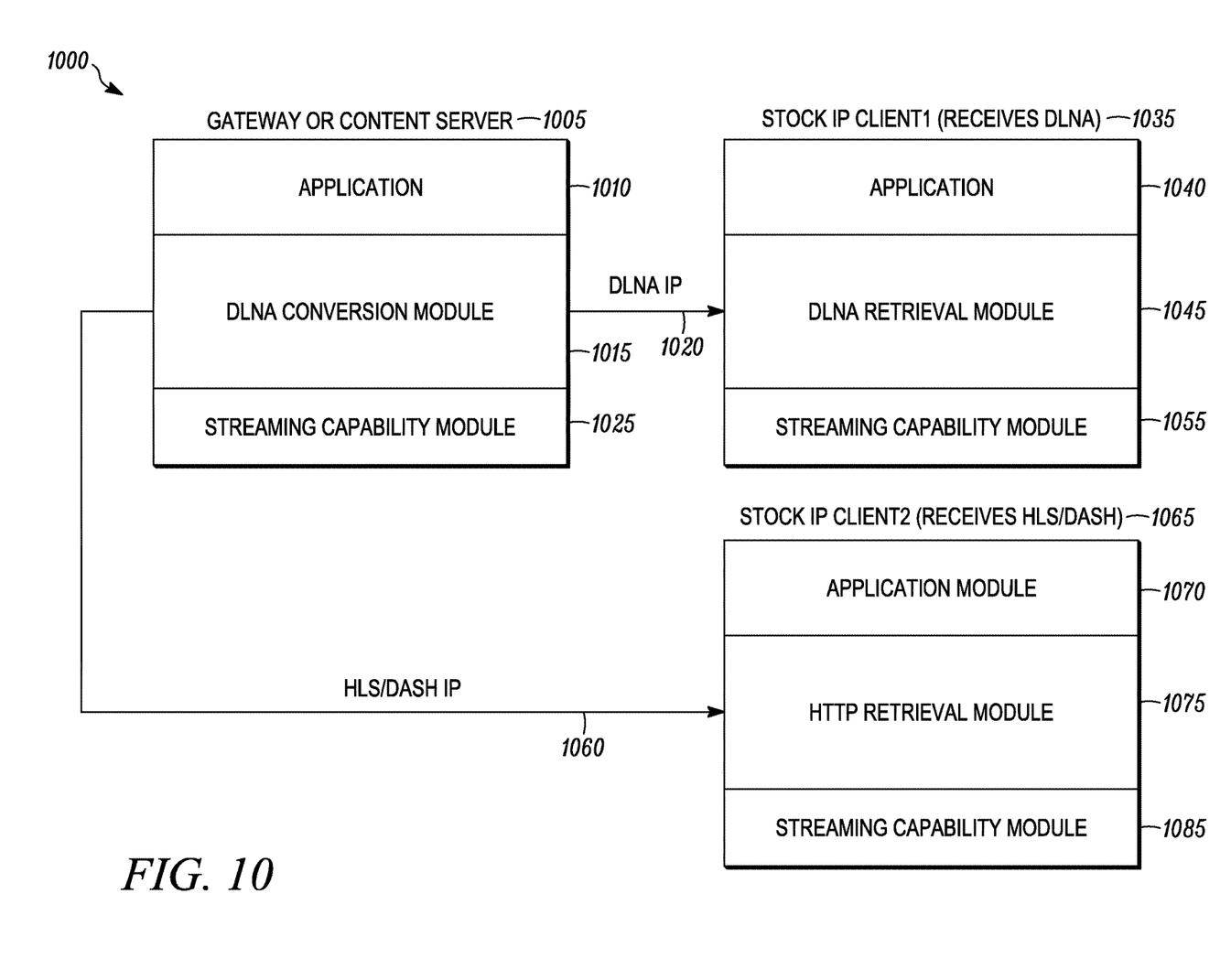
FIG. 10 is a functional block diagram illustrating an example system for providing DLNA-based streaming to a client device in accordance with embodiments of the disclosure.

FIG. 10 is a functional block diagram illustrating an example system 1000 for providing DLNA-based streaming to a client device in accordance with embodiments of the disclosure. System 1000 includes a gateway or content server 1005, a stock IP client 1 1035, and a stock IP client 2 1065. Gateway or content server 1005 includes an application module 1010, a DLNA conversion module 1015, and a streaming capability module 1025. Application module 1010 is configured to utilize DLNA or HLS/DASH streaming capability of a platform. DLNA conversion module 1015 is configured to convert HLS/DASH bit rate variant playlists to DLNA CDS items. Streaming capability module 1025 is configured to measure the bandwidth and provide the measurement to the DLNA conversion module 1015.

Stock IP client 1 1035 includes an application module 1040, a DLNA retrieval module 1045, and a streaming capability module 1055. Application module 1040 is configured to request a CDS item upon a media play request by the user. DLNA retrieval module 1045 is configured to fetch a CDS item according to the Stock IP client 1 1035 capabilities. Once a variant is selected, the gateway or content server 1005 may serve or direct different CDS items as needed per bandwidth. Streaming capability module 1055 is configured to provide the streaming measurements to the streaming capability module 1025 of the gateway or content server 1005. As shown, DLNA IP streaming 1020 is provided from gateway or content server 1005 to stock IP client 1 1035.

Stock IP client 2 1065 includes an application module 1070, an HTTP retrieval module 1075, and a streaming capability module 1085. Application module 1070 is configured to request a HLS playlist or a DASH manifest upon a media play request by the user. HTTP retrieval module 1075 is configured to fetch HLS/DASH playlist items according to the Stock IP client 2 1065 capabilities. In some embodiments, there is no change with respect to HLS/DASH processing. Streaming capability module 1085 is configured to provide the streaming measurements to the streaming capability module 1025 of the gateway or content server 1005. As shown, HLS IP streaming 1060 is provided from gateway or content server 1005 to stock IP client 2 1065.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality.

Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine-readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

What is claimed is:

1. A method of providing digital living network alliance (DLNA)-based streaming to client devices, the method comprising:
   receiving at a router HTTP live streaming (HLS) playlists or a HTTP (DASH) manifest from a server;
   creating a new DLNA-based content directory service (CDS) in the router having one or more CDS items for each of the HLS playlists or the DASH manifest; and
   publishing the DLNA-based CDS for given client devices,
   determining if multiple client devices are non-HLS or non-DASH compliant by classifying individual ones of the given client devices as a DLNA client device based upon receiving a CDS listing query on the server from the given client device,
   wherein the publishing the DLNA-based CDS to the given client devices is for each non-HLS or non-DASH compliant ones of the multiple client devices.

2. The method of claim 1, wherein the new DLNA-based CDS comprises one or more CDS items, wherein each CDS item comprises a unique universal resource indicator (URI) for each bitrate variant associated with the CDS item.

3. The method of claim 1, wherein creating a new DLNA-based CDS comprises:
   downloading a plurality of content segments for the HLS playlist; and
   creating a single transport stream (TS) file from the plurality of content segments.

4. The method of claim 3, wherein the creating a single TS file comprises concatenating the plurality of content segments for the HLS playlist into a single TS file URL.

5. The method of claim 1, wherein creating a new DLNA-based CDS comprises:
   downloading a plurality of content segments for the HLS playlist; and
   creating a plurality of transport stream (TS) files from the plurality of content segments, each TS file corresponding to a content segment.

6. The method of claim 1, wherein creating a new DLNA-based CDS comprises:
   pointing to a plurality of content segments for the HLS playlists.

7. The method of claim 1, wherein creating a new DLNA-based CDS comprises:
   downloading a plurality of .mpd files for the DASH manifest; and
   creating a single transport stream (TS) file from the plurality of content segments.

8. The method of claim 7, wherein the creating a single TS file comprises concatenating the plurality of transport stream files from a DASH manifest .mpd file into a single TS file URL.

9. The method of claim 1, wherein creating a new DLNA-based CDS comprises:
   downloading a plurality of content segments for the DASH manifest; and
   creating a plurality of transport stream (TS) files from the plurality of content segments, each TS file corresponding to a content segment.

10. The method of claim 1, wherein creating a new DLNA-based CDS comprises:
    pointing to a plurality of content segments for the DASH manifests.

11. The method of claim 1, further comprising:
    determining a streaming capability for the client device, wherein the streaming capability is selected from the group consisting of bandwidth, bit rate, computing power left, and combinations thereof.

12. The method of claim 11, wherein providing the CDS item to the given client devices comprises serving the DLNA-based stream to the given client devices at a desired bit rate matching client bandwidth availability.

13. The method of claim 11, wherein providing the CDS item to the given client devices comprises serving the DLNA-based stream based on client bandwidth availability.

14. The method of claim 11, wherein providing the CDS item to the given client devices comprises serving the DLNA-based stream based upon server bandwidth availability.

15. The method of claim 11, wherein providing the CDS item to the given client devices comprises serving the DLNA-based stream based upon a slowest bitrate of the given client devices.

16. The method of claim 11, wherein providing the CDS item to the client device comprises serving the DLNA-based stream based on client device type.

17. The method of claim 1,
wherein a predetermined maximum number of CDS items are created based upon a predetermined number of bitrate variants; and
wherein the predetermined number of bitrate variants comprises five or less.

* * * * *